United States Patent [19]  [11] 3,872,128
Byck  [45] Mar. 18, 1975

[54] ANTIMICROBIAL HYDROXY QUINOLINE, ETHYLENE-ACRYLIC POLYMER COMPOSITIONS

[75] Inventor: Joseph S. Byck, Middlesex, N.J.

[73] Assignee: Union Carbide Corporation, New York, N.Y.

[22] Filed: Mar. 8, 1972

[21] Appl. No.: 232,970

[52] U.S. Cl. .... 260/286 R, 260/32.4, 260/94.6 GB, 260/286 Q, 260/287 R, 260/287 O X, 260/289 O X, 260/289 R, 260/294.8 R, 260/294.9, 260/297 R, 260/501.15, 424/258, 424/263
[51] Int. Cl............................................ C07d 33/38
[58] Field of Search 260/287 O X, 289 O X, 286 R, 260/32.4, 94.6 GB, 286 Q

[56] References Cited
UNITED STATES PATENTS
2,984,639   5/1961   Stamberger et al................ 260/32.4
3,307,970   3/1967   Grier........................... 260/287 O X
3,391,114   7/1968   Schaefer et al............. 260/289 O X FOREIGN PATENTS OR APPLICATIONS
839,505   6/1960   United Kingdom ........... 260/286 Q

OTHER PUBLICATIONS

Collier et al., Chemical Abstracts, "Polymethylene bisquinolinium salts," (1960), 248179 e, Primary Examiner—Donald G. Daus
Assistant Examiner—D. Wheeler
Attorney, Agent, or Firm—Bernard Francis Crowe

[57] ABSTRACT

Ammonium polymer salts having antimicrobial properties have been prepared from carboxyl-containing α-olefin polymers and substituted quinolinium or pyridinium salts.

7 Claims, No Drawings

ANTIMICROBIAL HYDROXY QUINOLINE, ETHYLENE-ACRYLIC POLYMER COMPOSITIONS

BACKGROUND OF THE INVENTION

This invention pertains to compositions which evince antimicrobial properties and more particularly to carboxyl-containing α-olefin polymers which have been partially neutralized with quinoline or pyridine derivatives.

One of the many fields to which the modern trend towards the use of plastics has extended is that of medicine where myriad articles used for surgery and hospital and patient care can be fabricated from polymeric materials of construction. The articles used in this field have however certain specific and rigid requirements not found in most other areas where plastics are employed. For example, the articles must conform to general septic criteria which in the past have been met by various sterilization techniques such as heating, ultraviolet irradiation contacting with bacteriostatic or fungistatic media, and the like. Once sepsis is broken these sterilization techniques must be repeated where possible or the articles discarded. Even the act of disposal of contaminated articles, however, introduces its own health problems.

One solution to these problems consists in blending bacteriostatic and fungistatic additives into polymeric substrates prior to fabrication. This has not been satisfactory inasmuch as such additives are for the most part low molecular weight materials which migrate in the finished articles affording sticky, slippery and otherwise undesirable surfaces thereon. Aside from aesthetic and functional drawbacks this phenomenon can also result in surface concentrations of additives which are so high as to be unsafe or too low to be effective as physical contact removes additives from the surface. Furthermore low molecular weight additives may be degraded or destroyed during fabrication.

Another proposed solution to the problem of extending polymeric articles to the medical field involves the use of ammonium salts having the formula

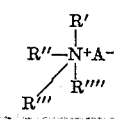

in which R' is hydrogen, lower alkyl or lower alkylol, R'' is lower alkyl or lower alkylol, R''' is alkyl, alkylol, aryl or aralkyl and R'''' is a long chain carbon substituent with more than 10 carbon atoms in the chain, and A is an anionic radical derived from a synthetic polymer of ethylenically unsaturated compounds. Because of the presence of the long chain carbon substitutent, R'''', these salts are generally ineffective for the fabrication of shaped articles used in medical practice because they tend to decompose at temperatures required for the molding, extruding and calendering of thermoplastic materials and thus lose their antimicrobial activity.

Another undesirable feature of the above-described polymer salts lies in the fact that they exhibit poor tensile strengths vis a vis the polymers from which they were synthesized.

SUMMARY OF THE INVENTION

Polymeric ammonium salts uniquely adapted for medical use both by virtue of their antimicrobial properties and because of their desirable physical and mechanical properties are provided by salts comprising:
cations selected cationsselected from the group consisting of (1) quinoline derivatives having the formula:

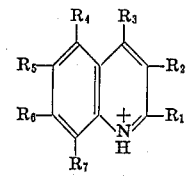

wherein each of $R_1$, $R_2$ and $R_3$ is a monovalent radical selected from the group consisting of H,OH, or lower alkyl, having up to about 8 carbon atoms, $R_4$ is a monovalent radical selected from the group consisting of H, lower alkyl, having up to about 8 carbon atoms, halogen, $NH_2$, $NO_2$, $NHCOCH_3$, CHO, $CH_2C_6H_5$ or

wherein $R_8$ is a monovalent radical selected from the group consisting of lower alkyl, having up to about 8 carbon atoms, and phenyl; $R_5$ is a monovalent radical selected from the group consisting of H, lower alkyl, OH or halogen; $R_6$ is a monovalent radical selected from the group consisting of H, halogen, or $NO_2$, and $R_7$ is a monovalent radical selected from the group consisting of H, OH, $OR_9$, halgoen, or

wherin $R_9$ is a lower alkyl, having up to about 8 carbon atoms; and (2). pyridine derivatives having the formula:

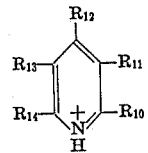

wherein each of $R_{10}$, $R_{11}$, $R_{13}$ and $R_{14}$ is a monovalent radical selected from the group consisting of —H, —OH, —CN, halogen or lower alkyl, having up to about 8 carbon atoms, and $R_{12}$ is a monovalent radical selected from the group consisting of —H, —OH, —$SO_2CH_3$ —CN or halogen; and b. anions of normally solid carboxyl-containing α-olefin polymers having polymerized therin a major amount of an α-olefin having the formula:

$$YCH = CH_2$$

wherein Y is selected from the group consisting of hydrogen and alkyl radicals having up to 10 carbon atoms.

Although not essential, it is preferred to employ as the carboxyl-containing α-olefin polymers of this invention interpolymers of α-olefins having the general formula:

$$Y-CH=CH_2$$

wherein Y is H or an alkyl group having up to 10 carbon atoms, the olefin content of said interpolymer being at least 50 mole percent of the total interpolymer and interpolymerized therewith an $\alpha,\beta$-ethylenically unsaturated carboxylic acid having up to 2 carboxylic acid groups, said unsaturated carboxylic acid constituting up to about 50 mole per cent of the total interpolymer.

However, the present invention is not limited to interpolymers derived from the interpolymerization of an $\alpha$-olefin and an $\alpha,\beta$-ethylenically unsaturated carboxylic acid. The starting polymer used to make the monovalent polymer salts used in this invention can also be provided by oxidizing olefinic polymers, such as those described in U.S. Pat. No. 3,155,644, by grafting carboxyl containing monomers onto an olefin polymer backbone by methods well known in the graft polymerization art, such as those described in U.S. Pat. No. 2,970,129, all of which are incorporated herein by reference or by grafting monomers such as carboxylic acid derivatives, i.e., esters, anhydrides, amides, nitriles and the like onto an olefin polymer backbone followed by conversion to free carboxylic acid groups after grafting.

Also included within the purview of this invention are halogenated, carboxyl containing $\alpha$-olefin polymers. The method of introducing the halogen into these polymers is not at all critical and so can be accomplished by first preparing a halogen free interpolymer of, for example, ethylene-acrylic acid and then halogenating that interpolymer by methods well known in the art or by interpolymerizing a halogen containing vinyl monomer with an $\alpha$-olefin and an unsaturated carboxylic acid. A specific example of this latter class of interpolymers is one obtained by interpolymerizing ethylene, vinyl chloride and acrylic acid. Other examples include interpolymers of ethylene-vinylidene chloride-acrylic acid, ethylene-vinyl chloride-methacrylic acid, ethylene-vinylidene choride-methylacrylic acid, ethylene-vinyl bromide-acrylic acid, ethylene-vinyl bromide-methacrylic acid, ethylene-vinyl fluoride-acrylic acid, ethylene-vinyl fluoride-methacrylic acid, ethylene-vinylidene fluoride-acrylic acid, ethylene-vinylidene fluoride-methacrylic acid, ethylene-vinyl iodide-acrylic acid, propylene-vinyl chloride-acrylic acid, propylene-vinyl chloride-methacrylic acid, propylene-vinylidene chloride-acrylic acid, propylene-vinylidene chloride-methacrylic acid and the like and mixtures thereof.

As indicated above, the $\alpha$-olefins preferably employed in the interpolymers of this invention are $\alpha$-olefins having the general formula:

$$YCH=CH_2$$

where R is either a hydrogen or an alkyl radical having up to 10 carbon atoms. Thus, suitable $\alpha$-olefins include: ethylene, propylene, butene-1, pentene-1, hexene-1, neohexene, octene-1, nonene-1, decene-1, 3-methylbutene-1, 4-methylpentene-1,3-methylhexene-1, 4,4-demethylhexene-1 and the like. Although polymers of higher olefins can be used, they are not as commercially available or economical as the lower olefins.

The $\alpha,\beta$-ethylenically unsaturated carboxylic acids used in the interpolymers of this invention preferably have 3 to 8 carbon atoms, although those having a greater number of carbon atoms can also be used, if desired. Specific examples include: acrylic acid, methacrylic acid, ethacrylic acid, itaconic acid, maleic acid, fumaric acid, and half esters of the above dicarboxylic acids such as, methyl hydrogen maleate, methyl hydrogen fumarate, ethyl hydrogen maleate, ethyl hydrogen fumarate and the like.

The starting polymers used to make the salts of this invention are not limited to two components. Therefore, additional copolymerizable monomers can be employed together with the olefin and carboxylic acid comonomers. The scope of the starting interpolymers which can be used is exemplified, although not limited by the following interpolymers: ethylene/acrylic acid interpolymers, ethylene methacrylic acid interpolymers, ethylene/itaconic acid interpolymers, ethylene/-methyl hydrogen maleate interpolymers, ethylene/-maleic acid interpolymers, ethylene/acrylic acid/-methyl acrylate interpolymers, ethylene/acrylic acid-/ethyl acrylate interpolymers, ethylene/methacrylic acid/methyl methacrylate interpolymers, ethylene/methacrylic acid/ethylmethacrylate interpolymers, ethylene/acrylic acid/methacrylic acid interpolymers, ethylene/methacrylic acid/methyl acrylate interpolymers, ethylene/acrylic acid/methyl methacrylate interpolymers, ethylene/methyl hydrogen maleate/ethyl acrylate interpolymers, ethylene/acrylic acid/vinyl acetate, ethylene/methacrylic acid/vinyl acetate/interpolymers, ethylene/propylene/acrylic acid interpolymers, ethylene/propylene/methacrylic acid interpolymers, ethylene/maleic acid/ethyl vinyl ether interpolymers, ethylene/butene-1/acrylic acid interpolymers, ethylene/neohexene/acrylic acid interpolymers, propylene/acrylic acid interpolymers/butene-1/acrylic acid interpolymers and the like.

The carboxyl content of the starting olefin polymer is preferably in the range of about 5 to 25 mole percent of the total polymer although contents of about 1 to 50 mole percent can also be employed, if desired.

For the particularly preferred base interpolymers which provide the anionic moiety of the polymer salts of this invention, viz., ethylene/acrylic acid or ethylene/methacrylic acid interpolymers, the preferred range of acrylic acid or methacrylic acid interpolymerized therein lies between about 4 and 25 mole percent of the total interpolymers. The melt index of these preferred interpolymers lies in the range of about 0.1 to about 1,000 dg./min.

The polymeric ammonium salts of this invention can be prepared by a dispersion process, a diffusion process or a melt process. The dispersion process is effected by charging carboxyl-containing $\alpha$-olefin polymers, e.g., ethylene-acrylic acid copolymers to a reactor with water and sufficient alkali metal hydroxide, e.g., sodium hydroxide, for neutralization of carboxyl moieties. The mixture is warmed to a temperature of about 95°C. until an ionomer dispersion is obtained. A suitable antimicrobial ammonium salt, such as, 8-hydroxy quinolinium chloride, sulfate, citrate and the like, is then added to the ionomer dispersion, whereupon the polymeric ammonium salt precipitates out of the aqueous system and is recovered by filtration, centrifugation, decantation or a like isolation technique and dried.

In the diffusion process carboxyl-containing $\alpha$-olefin polymer pellets, sheets, films or other shaped articles are immersed in a dilute aqueous solution of alkali metal hydroxides at a temperature range of about 25°C. to about 80°C. The articles are then immersed in a dilute solution of a suitable antimicrobial ammonium salt at a temperature range of about 25°C. to about 65°C., recovered from the solution and dried.

In the melt process aqueous solutions of antimicrobial ammonium salts are mixed with pellets of alkali metal salts of carboxyl-containing α-olefin polymers, water stripped off under vacuum and the product fluxed on a mill at about 235°–250°F. The polymeric ammonium salts thus obtained can be extruded, pelleted and stored for future use. For example, these salt pellets can be used for the fabricating of films tubes, rods and a myriad of shaped articles by extrusion and molding techniques known in the polymer art. Specific items which can be manufactured for medical applications include: sheets, coverings, pillow cases, catheters, enema nozzles, waste containers and the like.

The antimicrobial properties of the polymeric ammonium salts of this invention were determined by the following test procedure.

AGAR PLATE ZONE OF INHIBITION ASSAY

In the "zone of inhibition" assay technique, the test microorganism is seeded in a suitable agar growth medium. Discs of the polmer containing the antimicrobial agent are placed on the surface of the medium and the culture is incubated under suitable time/temperature conditions. The antimicrobial agent diffuses from the disc through the agar medium and a clear zone of no-growth remains surrounding the disc where inhibitory concentrations are attained. The remainder of the agar surface where bacterial growth develops becomes opaque resulting in a halo or zone of inhibition surrounding the disc. The size of the zone of inhibition is dependent upon the effectiveness of the antimicrobial, its rate of diffusion and its solubility as well as the physiological state of the test organism, the composition of the growth medium, time and temperature of incubation, and other experimental conditions.

Although the zone of inhibition test is not a measure of the effectiveness of antibacterial films in use applications, it does show how much of the active agent is available on the film surface.

The test organism, Staphylococcus aureus 209, was cultured in nutrient broth at 35°C. for 18 hours. The broth culture was inoculated into melted and cooled tryptone-glucose agar medium (Difco) at 0.5 ml./100 ml. medium. Ten milliliters of seeded agar was pipetted into sterile petri dishes and allowed to solidfy.

"Check" discs, containing a known concentration of the antimicrobial ammonium compound and sample discs of equal size cut from film samples with a cork borer were placed on each agar plate. The check discs were used to correct for plate to plate variations in zones of inihibition. In every case two sample discs and one check disc were placed on each plate and two or more replicate plates were prepared for each sample. Plates were incubated overnight at 35°C. and zone diameters were measured. Zones of Inhibition were calculated using the formula:

$$W = T - D/2$$

where:
W = Width of clear zone in mm.
T = Total diameter of specimen and clear zone.
D = Diameter of specimen (13 mm.)

In addition to being fabricated into films, tubes, rods and other shaped articles, the antimicrobial polymer compositions of this invention can also be mechanically melt-blended with other normally solid thermoplastic polymers of ethylenically unsaturated monomers having up to 20 carbon atoms. Illustrative polymers include:

low density polyethylene, high density polyethylene, polypropylene, ethylene-propylene copolymers, ethylenealkyl acrylate copolymers, ethylene-vinyl acetate copolymers, polystyrene, vinyl chloride polymers, and the like.

The resulting compositions exhibit antimicrobial properites as determined by the test procedures described hereinabove. The antimicrobial activity of these blends has been found to be equal to or greater than that which would be predicted from the concentration of the antimicrobial polymer present.

The preferred polymeric ammonium salts of this invention are those containing anions obtained by removing a proton from carboxyl groups of ethylene/acrylic acid or ethylene/methacrylic acid interpolymers and cations obtained by adding a proton to the following quinoline or pyridine derivatives:

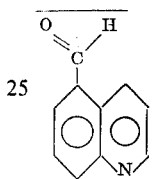

5-formyl-8-hydroxyquinoline.

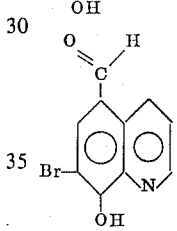

7-bromo-5-formyl-8-hydroxy-quinoline.

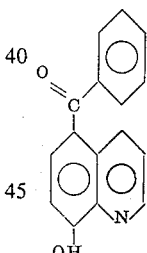

5-benzoyl-8-hydroxyquinoline.

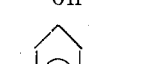

2-hydroxypyridine.

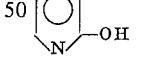

4-hydroxypyridine.

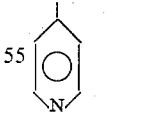

2,3,5,6-tetrachloro-4-methylsulfonylpyridine.

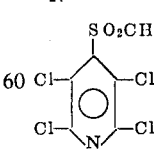

3,4,5-trichloro-2,6-dicyano-pyridine.

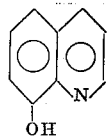 8-hydroxyquinoline.

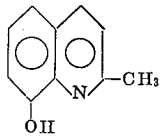 2-methyl-8-hydroxyquinoline.

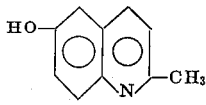 2-methyl-6-hydroxyquinoline.

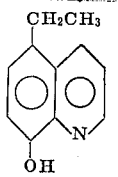 5-ethyl-8-hydroxyquinoline.

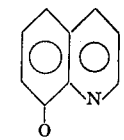 8-acetoxyquinoline.

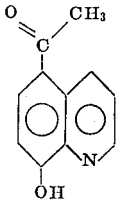 5-acetyl-8-hydroxyquinoline.

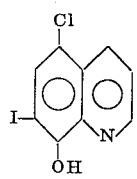 5-chloro-7-iodo-8-hydroxyquinoline.

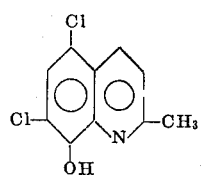 5,7-dichloro-2-methyl-8-hydroxyquinoline.

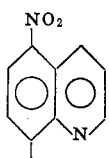 5-nitro-8-hydroxyquinoline.

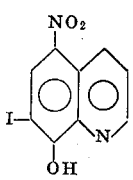 7-iodo-5-nitro-8-hydroxy-quinoline.

The invention is further described in the Examples which follow. All parts and percentages are by weight unless otherwise specified.

EXAMPLE 1

The preparation of an antimicrobial polymer salt by a melt process was demonstrated by the following example.

A 75 gram sample of an ethylene-acrylic acid copolymer having a melt index of about 337 dg./min. and containing about 20 weight per cent of acrylic acid copolymerized therein was fluxed on a two-roll mill at 180°–185°C. and a solution of 3.3 grams of sodium hydroxide in 20 grams of water was then added in one portion. The mixture was fluxed at 180°–185°C. on the two-roll mill for an additional 10 minutes, and a 19.5 gram sample of solid 8-hydroxyquinolinium sulfate was then added. The mixture was fluxed at 180°–185°C. for an additional 20 minutes and then cooled to room temperature to give an 8-hydroxyquinolinium salt of ethylene-acrylic copolymer. This product had a 5 mm zone of inhibition by the antimicrobial assay described hereinabove.

EXAMPLE 2

The preparation of an antimicrobial polymer salt by a diffusion process was demonstrated by the following example.

A 120 gram sample of an ethylene-acrylic acid copolymer (having a melt index of about 52 dg./min. and containing 19.6 weight per cent of acrylic acid copolymerized therein was suspended in a solution of 5.33 grams of sodium hydroxide in 120 ml of water and the mixture was heated with stirring to about 70°C. and held at 70°C. for 3 hours. The mixture was then cooled to 30°–35°C. and a solution of 11.6 grams of 8-hydroxyquinoline in 8.15 grams 38 weight per cent hydrochloric acid and 175 ml of water was added over a one hour period. The mixture was then heated to 60°C. and held at 60°C. for three hours, and cooled to 25°–30°C. The ethylene-acrylic acid copolymer 8-hydroxyquinolinium salt was filtered, washed twice each with water and acetone, and dried under reduced pressure. The plastic product showed a 52 mm zone of inhibition in the antimicrobial assay described hereinabove.

EXAMPLE 3

The preparation of an antimicrobial salt by a dispersion process was demonstrated by the following example.

A suspension of 240 grams of pellets of an ethylene-acrylic acid copolymer (having a melt index of about 52 dg./min. and containing about 19 percent by weight of acrylic acid copolymerized therein) in a solution of 10.67 grams of sodium hydroxide in 240 grams of water was heated with agitation for three hours at 90°–95°C., forming a fine dispersion from the copolymer pellets. The dispersion was then cooled to 30°–35°C. and a solution of 23.2 grams of 8-hydroxyquinoline in 16.3 grams of 38 weight per cent hydrochloric acid and 350 grams of water was added with agitation over a 35 minute period. The mixture was then heated to about 60°C. for three hours with agitation, cooled to 30°–40°C., and filtered under vacuum. The polymer filter cake was then washed twice with two volumes of water, twice with acetone, and dried under vacuum at 50°C. for 24 hours to give a finely divided power. The plastic ethylene-acrylic acid copolymer 8-hydroxyquinolinium salt product showed a 12 mm zone of inhibition in the antimicrobial assay described herein.

EXAMPLES 4-6

When Examples 1-3 are repeated with the exception that an ethylene-methacrylic acid copolymer (having a melt index of about 350 dg./min. and containing about 18-19 weight per cent of methacrylic acid copolymerized therein) is substituted for the ethylene-acrylic acid, copolymer salts exhibiting a comparable antimicrobial assay are obtained.

EXAMPLE 7

A solution was prepared by adding 27.3 grams of 4-methylsulfonyl-2,3,5,6-tetrachloropyridine to 125 ml of boiling methanol containing 7.8 grams of concentrated hydrochloric acid. This solution was added hot to 345 grams of a well stirred 29 percent solids aqueous emulsion of a 30 percent neutralized sodium salt of ethylene/acrylic acid copolymer (containing 19 percent acrylic acid prepared as in Example 1). An additional 50 ml. portion of methanol was added and the mixture was stirred over-night. The precipitate which formed was filtered and dried under vacuum. Compression molded plaques of this material were shown by zone of inhibition assay to exhibit antimicrobial activity.

EXAMPLES 8-23

When Example 1 is repeated with the exception that the 8-hydroxyquinolinium sulfate is replaced by sulfates of 5-formyl-8-hydroxyquinoline; 7-bromo-5-formyl-8-hydroxyquinoline; 5-benzoyl-8-hydroxyquinoline; 2-hydroxypyridine; 4-hydroxypridine; 2,3,5,6-tetrachloro-4-methylsulfonyl-pridine; 3,4,5-trichloro-2,6-dicyanopyridine; 2-methyl-8-hydroxyquinoline; 2-methyl-6-hydroxyquinoline; 5-ethyl-8-hydroxyquinoline; 8-acetoxyquinoline; 5-acetyl-8-hydroxyquinoline; 5-chloro-7-iodo-8-hydroxyquinoline; 5,7-dichloro-2-methyl-8-hydroxyquinoline; 5-nitro-8-hydroxyquinoline; 7-iodo-5-nitro-8-hydroxyquinoline, polymer salts of comparable antimicrobial activity are obtained.

EXAMPLES 24-34

The efficacy of the antimicrobial polymer salts of this invention when mechanically blended with other thermoplastic polymers was demonstrated by the following example.

A mixture of 5 grams of an 8-hydroxyquinolinium salt of an ethylene-acrylic acid copolymer, (prepared as in Example 1 in which 25 mole percent of the carboxyl groups of the copolymer were in the form of 8-hydroxyquinolinium salt moieties) and 95 grams of low density polyethylene having a melt index of 1.7 to 2.4 dg/min. at 190°C. and 44 psi and a density of 0.915 to 0.920 g./ml. at 23°C. was fluxed on a two-roll mill for 15 minutes at 160°-165°C., removed from the mill, and cooled to room temperature. The resultant polymer blend exhibited a zone of inhibition of 17.4 mm as determined by the test procedures described hereinabove.

A series of mechanical blends in which the weight percent of the antimicrobial polymer salt described above was varied from 0.5 to 90 weight per cent was prepared and tested. The results obtained are delineated in the table below together with the zone of inhibition assay of the pure salt itself.

| Weight Percent Antimicrobial Polymer | Weight Percent Polyethylene | Zone of Inhibition (mm) |
|---|---|---|
| 0.5 | 99.5 | 5.5 |
| 1.0 | 99.0 | 9.4 |
| 2.0 | 98.0 | 11.4 |
| 5.0 | 95.0 | 17.4 |
| 10.0 | 90.0 | 24.1 |
| 20.0 | 80.0 | 27.5 |
| 30.0 | 70.0 | 28.1 |
| 50.0 | 50.0 | 35.3 |
| 70.0 | 30.0 | 37.3 |
| 90.0 | 10.0 | 28.6 |
| 100.0 | zero | 36.5 |

Although the invention has been described in its preferred forms with a certain degree of particularity, it is understood that the present disclosure of the preferred forms has been made only by way of Example and that numerous changes may be resorted to without departing from the spirit and scope of the invention.

What is claimed is:

1. Antimicrobial ammonium salt composition consisting of:
   a. cations of a quinoline selected from the group consisting of 5-formyl-8-hydroxyquinoline, 7-bromo-5-formyl-8-hydroxyquinoline, 5-benzoyl-8-hydroxyquinoline, 8-hydroxyquinoline, 2-methyl-8-hydroxyquinoline, 2-methyl-6-hydroxyquinoline, 5-ethyl-8-hydroxyquinoline, 8-acetoxyquinoline, 5-acetyl-8-hydroxyquinoline, 5-chloro-7-iodo-8-hydroxyquinoline, 5,7-dichloro-2-methyl-8-hydroxyquinoline, 5-nitro-8-hydroxyquinoline, and 7-iodo-5-nitro-8-hydroxyquinoline, and
   b. anions of a normally solid copolymer of ethylene and acrylic or methacrylic acid having polymerized therein a major amount of ethylene.

2. Salt claimed in claim 1 wherein said copolymer contains about 75 to 98 percent of ethylene polymerized therin.

3. Composition claimed in claim 1 wherein the quinoline is 8-hydroxyquinoline.

4. Composition claimed in claim 1 wherein the quinoline is 5-formyl-8-hydroxyquinoline.

5. Composition claimed in claim 1 wherein the quinoline is 7-bromo-5-formyl-8-hydroxyquinoline.

6. Composition claimed in claim 1 wherein the quinoline is 2-methyl-6-hydroxyquinoline.

7. Composition claimed in claim 1 wherein the quinoline is 5-ethyl-8-hydroxyquinoline.

* * * * *